(12) United States Patent
DiTomaso et al.

(10) Patent No.: US 10,460,261 B2
(45) Date of Patent: Oct. 29, 2019

(54) SYSTEM AND METHOD FOR DETERMINING VALIDITY OF WEB CONTENT

(71) Applicants: Joseph DiTomaso, New York, NY (US); William Beckler, New York, NY (US)

(72) Inventors: Joseph DiTomaso, New York, NY (US); William Beckler, New York, NY (US)

(73) Assignee: ALLTHEROOMS, New York, NY (US)

(*) Notice: Subject to any disclaimer, the term of this patent is extended or adjusted under 35 U.S.C. 154(b) by 300 days.

(21) Appl. No.: 15/271,455

(22) Filed: Sep. 21, 2016

(65) Prior Publication Data

US 2018/0082221 A1    Mar. 22, 2018

(51) Int. Cl.
*G06Q 10/02* (2012.01)
*G06Q 10/10* (2012.01)
*G06Q 30/06* (2012.01)
*G06Q 50/12* (2012.01)

(52) U.S. Cl.
CPC ........... *G06Q 10/02* (2013.01); *G06Q 10/025* (2013.01); *G06Q 10/1093* (2013.01); *G06Q 30/0645* (2013.01); *G06Q 50/12* (2013.01)

(58) Field of Classification Search
CPC .... G06Q 10/02; G06Q 50/12; G06Q 10/1093; G06Q 30/0645

USPC ........................................................... 705/5
See application file for complete search history.

(56) References Cited

U.S. PATENT DOCUMENTS

| | | | |
|---|---|---|---|
| 2002/0082977 A1* | 6/2002 | Hammond | G06Q 30/02 705/37 |
| 2011/0015954 A1* | 1/2011 | Ward | G06Q 10/02 705/5 |
| 2011/0047083 A1* | 2/2011 | Lawler | G06Q 20/10 705/80 |

OTHER PUBLICATIONS

Aki-Hiro Sato; Patterns of regional travel behavior: An analysis of Japanese hotel reservation data; Jul. 14, 2011 (Year: 2011).*

* cited by examiner

*Primary Examiner* — Kevin H Flynn
*Assistant Examiner* — Dione N. Simpson
(74) *Attorney, Agent, or Firm* — Buckley, Maschoff & Talwalkar LLC

(57) ABSTRACT

Provided are a system and method for determining whether an apparent booking is a genuine or actual booking. Bookings occur in all sorts of industries, such as travel, medical, entertainment, weddings, catering, and the like. In one embodiment, the method includes determining whether an apparent booking identified from a website calendar, and associated with a merchant, is a genuine booking of the merchant or is an unavailability of the merchant not related to a booking. For example, the genuineness of the booking may be determined based on additional information associated with the merchant, a geographic location, other merchants, and the like.

20 Claims, 5 Drawing Sheets

AUGUST 2016

| SUN | MON | TUE | WED | THU | FRI | SAT |
|---|---|---|---|---|---|---|
|  | 1 | 2 | 3 | 4 | ✗ 5 | ✗ 6 |
| ✗ 7 | ✗ 8 | 9 | 10 | ✗ 11 | ✗ 12 | 13 |
| 14 | 15 | 16 | 17 | 18 | 19 | 20 |
| 21 | 22 | 23 | 24 | 25 | ✗ 26 | ✗ 27 |
| ✗ 28 | 29 | 30 | 31 |  |  |  |

1st Point in Time →

220

AUGUST 2016

| SUN | MON | TUE | WED | THU | FRI | SAT |
|---|---|---|---|---|---|---|
|  | 1 | 2 | 3 | 4 | ✗ 5 | ✗ 6 |
| ✗ 7 | ✗ 8 | 9 | 10 | ✗ 11 | ✗ 12 | 13 |
| 14 | 15 | ✗ 16 | ✗ 17 | ✗ 18 | ✗ 19 | ✗ 20 |
| 21 | 22 | 23 | 24 | 25 | ✗ 26 | ✗ 27 |
| ✗ 28 | 29 | 30 | 31 |  |  |  |

2nd Point in Time →

SYSTEM AND METHOD FOR DETERMINING VALIDITY OF WEB CONTENT

BACKGROUND

Various search engines and comparison websites compare content associated with an item from multiple sources and provide a viewer with a comparison of attributes of the item from the web content, for example, a price comparison, feature comparison, availability comparison, and the like. One industry where these comparisons often take place is in the travel industry on travel related websites such as TripAdvisor, Trivago, Hotels.com. Hotwire, Travelocity, and many others. These travel related websites allow web visitors to filter and compare attributes of hotel accommodations, flights, car rentals, and the like. For example, a reader on one of these sites may search for and determine whether a hotel has any vacancies available on a particular day. However, m most cases, the reader is unable to determine how many total rooms are available at that hotel. In other words, the hotel may have 1 room available or it may have 100 rooms available but the reader is only provided with whether any vacancy exists. Accordingly, it is not possible to determine how many travelers are staying at a hotel during a particular time.

Many merchants that provide services or hotel/accommodation rental properties will use a calendar to provide an indication of dates of availability and dates of unavailability. For example, a hotel website may have calendar included in a web page thereof and the owner may cross out or otherwise make unavailable a period of time such as a day, a week, a month, etc., indicating that the hotel is unavailable during that period of time. However, a viewer of the calendar is unaware of whether the hotel is unavailable during that time because the hotel is full of guests, or if the hotel is unavailable for other reasons such as the hotel being closed, weather, season, or the like. Accordingly, what is needed is a system that can determine whether a calendar unavailability is the result of a genuine booking or whether the unavailability is for other reasons which an provide insight into the number of travelers visiting a particular area at a particular point in time rather than waiting until the travelers have already arrived in the area.

SUMMARY

According to an aspect of an example embodiment, provided is a method for determining genuine bookings, the method including comparing web content from a merchant website at a first point of time and the web content from the merchant website at a second point of time, identifying an apparent booking of the merchant based on a differential between the web content at the first point of time and the web content at the second point of time, determining whether the apparent booking is a genuine booking of the merchant or not a booking, based on information collected from the merchant website, and in response to determining that the apparent booking is a genuine booking of the merchant, storing an identification of the genuine booking of the merchant in a database along with identifications of other genuine bookings of other merchants.

According to an aspect of another example embodiments, provided is a device for determining genuine bookings, the device including a processor configured to compare web content from a merchant website at a first point of time and the web content from the merchant website at a second point of time, identify an apparent booking of the merchant based on a differential between the web content at the first point of time and the web content at the second point of time, and determine whether the apparent booking is a genuine booking of the merchant or not a booking based on information collected from the merchant website, and a controller configured to, in response to the processor determining that the apparent booking is a genuine booking of the merchant, store an identification of the genuine booking of the merchant in a database along with identifications of other genuine bookings of other merchants.

According to an aspect of another example embodiments, provided is a non-transitory computer-readable storage medium having stored therein instructions that when executed cause a computer to perform a method for determining genuine bookings, the method including comparing web content from a merchant website at a first point of time and the web content from the merchant website at a second point of time, identifying an apparent booking of the merchant based on a differential between the web content at the first point of time and the web content at the second point of time, determining whether the apparent booking is a genuine booking of the merchant or not a booking, based on information collected from the merchant website, and in response to determining that the apparent booking is a genuine booking of the merchant, storing an identification of the genuine booking of the merchant in a database along with identifications of other genuine bookings of other merchants.

Other features and aspects may be apparent from the following detailed description, the drawings, and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating an apparent booking being identified based on a calendar differential in accordance with an example embodiment.

Figure 1:
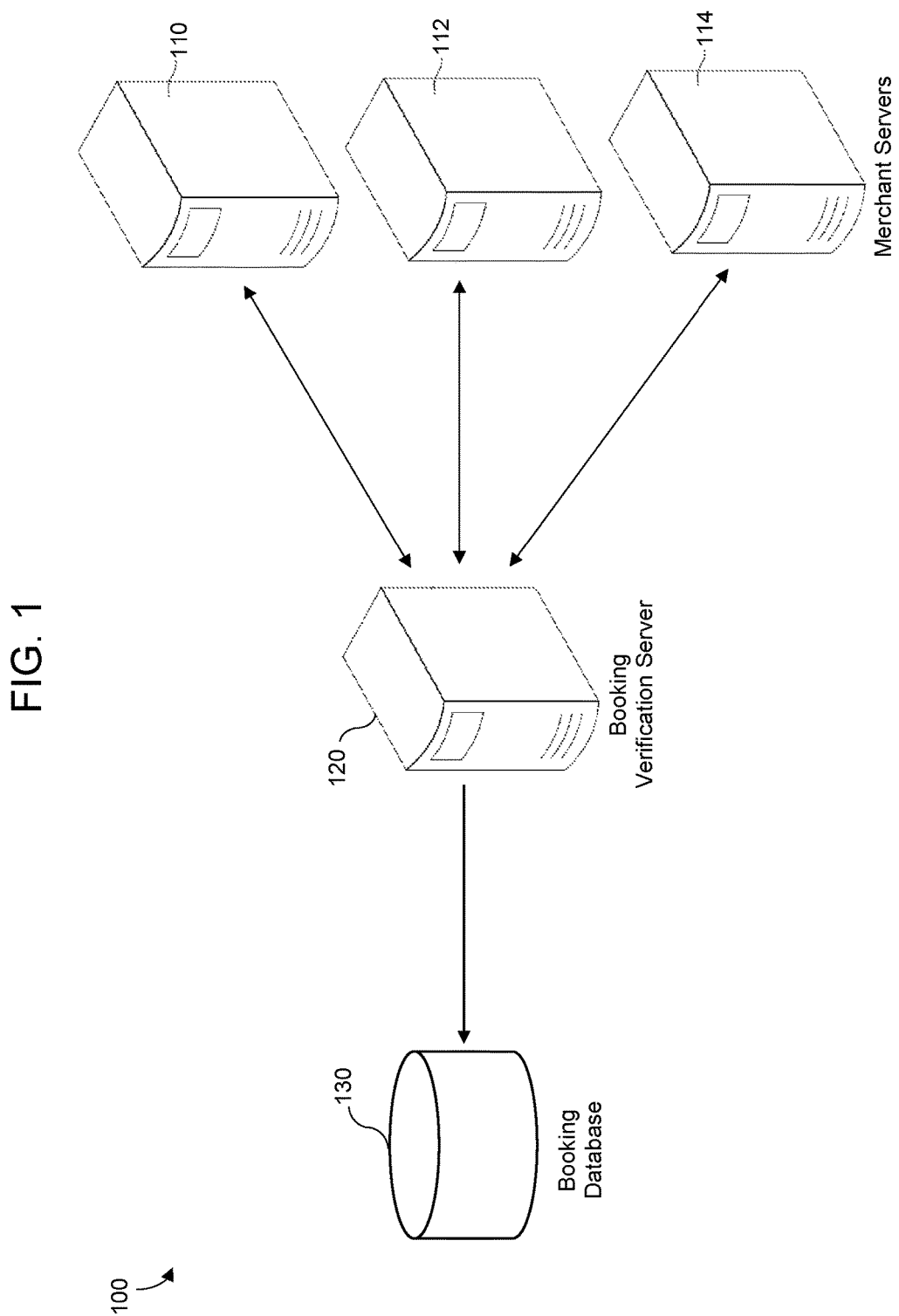
FIG. 1 is a diagram illustrating a system for determining genuine bookings from merchant websites in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

According to various aspects, provided herein is a system and method for determining the validity of an online booking on a merchant website or an associated website. Bookings are used in various industries to reserve a product, service, property, or the like, for a future date, for example, rental properties (vacation homes, villas, bed and breakfasts, cottages, etc.), medical services (spas, massages, chiropractor, doctor appointments, etc.), venue reservations (weddings, concerts, sporting events, graduations, ceremonies, etc.), entertainment, catering, transportation services, and many others. A merchant may use an online calendar in order to indicate that a booking has occurred and that the merchant service or accommodation is unavailable during a particular period of time (e.g., a day, a week, a month, etc.). As one example, when the merchant is a vacation rental owner, the owner may indicate that the vacation rental is unavailable to rent on various days using an online calendar. For example, the calendar may include markings, shadings, line drawings, and the like, within web content of the calendar corresponding to the unavailable days.

In some cases though, services and property rentals may be unavailable for other reasons besides actual bookings by consumers. For example, a service may be unavailable due to a particular time of year (season), an emergency, a slowdown in business, or other reasons. As another example, in the case of rental properties (e.g., vacation homes), the property may be available to rent for a portion of the year such as during a particular season (summer or winter) while the owners may occupy the property during other periods of the year. In this example, the owner may list the property as unavailable on a website calendar associated with the rental property to indicate the time periods during which the owner is occupying the property. However, to an online viewer the unavailability may look like a booking by a customer (another traveler).

The example embodiments provide a system and method for determining whether an unavailability of a merchant (i.e., an apparent booking) is a genuine booking of the merchant or caused by some other unavailability. For example, an apparent booking may be identified based on a calendar differential identified from an online calendar associated with a merchant and a genuineness of the apparent booking may be determined based on additional information associated with the merchant, additional information about a geographical area associated with the merchant, additional information about other similar merchants, and the like. In various embodiments herein, a genuineness of an apparent booking of a rental property is determined, however, it should be appreciated that the example embodiments are not limited thereto. For example, the system and method described herein may be used to validate bookings in all types of areas in which booking s are used such as medical services, entertainment venues, restaurants, and the like.

In the example of a rental property, additional information about the rental property, about a geographical destination of the rental property, about other rental properties in the same geographical destination, and the like, may be used to analyze and determine whether an apparent booking is a genuine booking or a non-booking. By determining how many rental properties are genuinely booked in a particular geographical area at a particular time, the embodiments can provide an accurate insight into the economy of a particular destination, travel trends, and the like. For example, a ratio of booked rental properties versus available rental properties can be used to determine how many people are travelling to an area at a given time which can be used to estimate travel trends for the area at a future point in time. That is, it can provide an indication of periods of time when the economy may be stronger or when more supply and demand may be needed.

Bookings are commonly used in the service industry and accommodations industry where search engines and other websites provide a listing of available services and rental properties (not just hotels) but places that have individual calendars for each room (e.g., vacation homes) which can be searched on a regular basis. FIG. 1 illustrates a system 100 for determining genuine bookings from merchant websites in accordance with an example embodiment. Referring to FIG. 1, the system 100 includes a booking verification server 120 (or group of servers) that may crawl the Internet and detect bookings from rental property calendars listed on websites hosted by merchant servers 110, 112, and 114. According to various aspects, the booking verification server 120 may visit and extract data from merchant websites, or otherwise receive the data form merchant websites, such as prices and availability of services, accommodations, and the like, among other things and identify unavailability (also referred to as an apparent booking). The booking verification server 120 may provide this information within a search engine hosted by the booking verification server 120 or to an external device.

According to various embodiments, the booking verification server 120 may crawl respective websites on a regular basis, a periodic basis, a random basis, or the like, and detect a calendar differential from calendar content associated with a rental property to identify an unavailability of the rental property. Furthermore, the booking verification server 120 may determine whether an apparent booking is a genuine (i.e., actual) booking based on additional information gathered from the rental property website or other data source. For example, the additional information may include information about the rental property, information about the apparent booking, information about a geographical destination of the rental property, information about other rental properties in the geographical destination, a time of year, an amount of time until the apparent booking, a length of stay of the booking, and the like. Accordingly, genuine bookings may be identified on a property-by-property basis or even a room-by-room basis by analyzing online calendars associated with many different rental properties.

A rental property may update its bookings on an associated website on a periodic or regular basis such as once a day or once every few hours. Accordingly, the booking verification server 120 may monitor those sites regularly and provide a complete birds-eye view of the industry of vacation rentals such as economy, travel trends, and the like, in real-time and as they occur. As an example, the booking verification server 120 may visit every page on every rental property hosted by merchant servers 110, 112, and 114 through the Internet and detect calendar content associated with unavailability (also referred to as apparent bookings) of the rental property. In one example embodiment, the booking verification server 120 may perform dozens of requests each second (e.g., 50 requests, 100 requests, or more) using many servers (e.g., 50 servers) to handle such requests at once. Accordingly, the booking verification servers 120 may handle millions of requests on a daily basis (e.g., 4 million requests each day). As a result, the booking verification server 120 according to example embodiments may provide insight into regional economies based on rental property availability in a geographic region.

Rental properties such as vacation homes, condos, and other unit-by-unit rentals may provide insight into the travel industry that is not available from present day hotel websites because hotel websites typically only provide an indication of whether a hotel has some sort of availability on a given day or over a period of days but does not indicate how booked or how full the hotel is. For example, hotel availability calendars typically cannot be used (at least for most hotels currently in the industry) to perform a room-by-room analysis. As a result, the difference between a rental property calendar and a hotel calendar is that a rental property calendar indicates occupancy on a unit-by-unit basis. In contrast, a hotel may have 99% of its rooms occupied but still be listed as having availability. In this case, it is not possible to determine whether the hotel has 1 room available or dozens of rooms available because the hotel is merely listed as having availability. That is, there is little benefit in performing a calendar differential on current hotel calendar availabilities because the differential would not be based on a room-by-room analysis but would instead be based on a hotel-by-hotel analysis. In contrast, a rental property calendar allows for an analysis that drills down farther than a calendar of a hotel.

Some of the other advantages of the example embodiments include large scale analysis in differentiating between a genuine booking of a traveler versus what looks like a booking but really isn't a booking. By doing such an analysis on a large scale such as a town, a city, a zip code, and the like, regional needs (e.g., supplies, food, water, etc.) may be predicted for points of time in the future, travel trends may be studied, and the like. Furthermore, the booking verification servers 120 may compare calendars of a rental property at two different points of time (e.g., from one day to the next) to determine changes that have occurred to content included in the calendar indicating that a rental property is unavailable. To perform such a large scale differential analysis, the booking verifications servers 120 may include a massive amount of server firepower that may be used by the booking verification servers 120 to perform an analysis (page requests) of thousands (or even millions) of rental properties that are listed on the Internet.

The calendar differential tool described herein may be used to extract or otherwise collect insight into the travel accommodation industry. For example, individual calendars of a large number of online bookable properties on the Internet may be checked at a frequency that allows individual transactions to be detected, and at least daily. Furthermore, the daily calendar data may be combined over time to identify likely bookings.

The example embodiments may include a valid booking classifier (VBC) tool or application that executes on a booking verification server. Apparent bookings may be identified and analyzed to determine if they were in fact genuine bookings using the VBC. The VBC may be built by comparing many (e.g., millions) of likely bookings with a known booking indicator, for example, a number of reviews. While the number of reviews does not tell which apparent bookings are genuine or real, it does correlate with actual genuine bookings, and that correlation makes it possible to use reviews as a machine learning training dataset. For example, the VBC may perform a large scale analysis of the apparent bookings crossed with the numbers of reviews of the rental property to determine a fingerprint of a genuine booking versus what looks like a booking but in actuality is not a booking. Each page of each rental website may provide its own availability which allows the system described herein to determine exactly how many vacation properties are being booked at any given time in any given geographical area or destination such as a city, a town, a neighborhood, a zip code, a zip code+4, and the like.

The training dataset may be used to identify parameters of an apparent booking that indicate whether it is a genuine booking. Examples of various parameters are provided in FIG. 3. The training dataset may be used to train the VBC application such that the VBC is able to identify genuine bookings among the likely bookings and also identify non-bookings from among the likely bookings. Furthermore, when the VBC is applied on a global basis using daily calendar differentials, it is possible to aggregate bookings in time and space to answer important questions about economic health of a region, travel trends, and future demand for other services based on the flow of people into and out of a geographical place.

Figure 3:
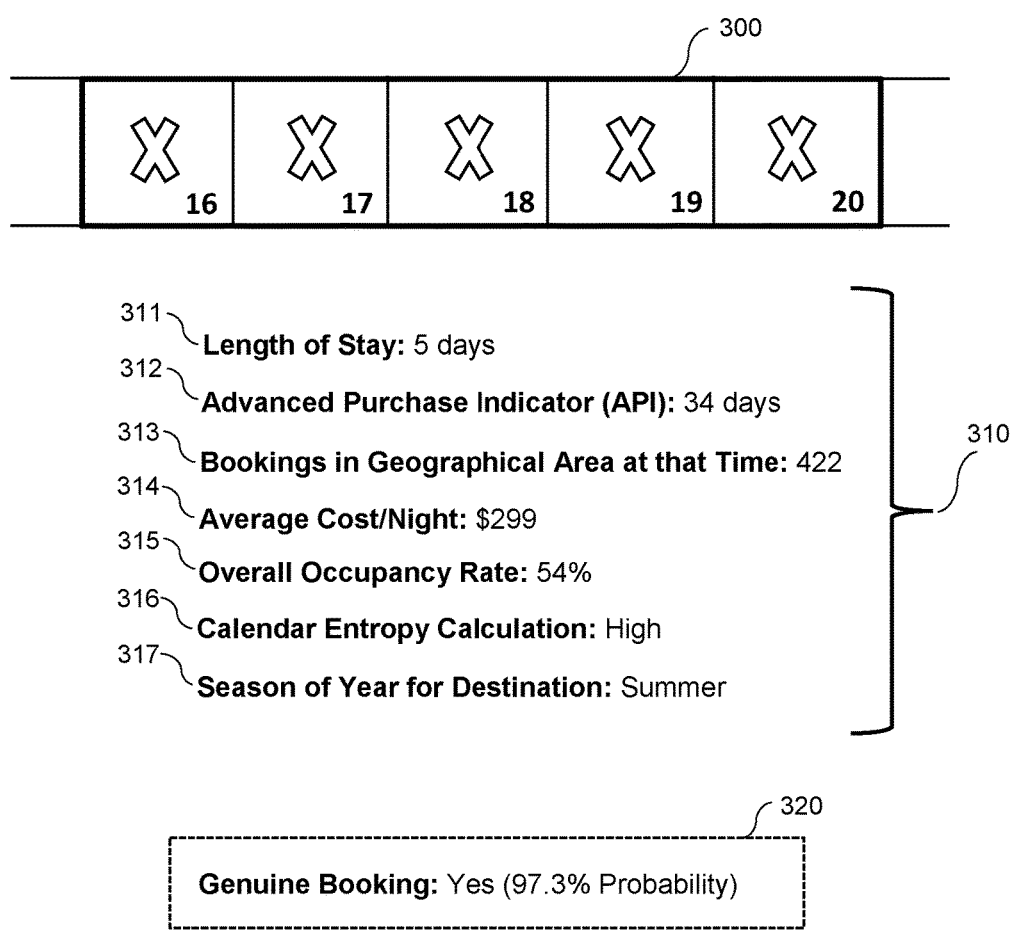
FIG. 3 is a diagram illustrating additional content for determining a genuine booking of a merchant in accordance with an example embodiment.

FIG. 2 illustrates an apparent booking being identified based on a calendar differential in accordance with an example embodiment, and FIG. 3 illustrates additional content that may be used for determining a genuine booking of a merchant in accordance with an example embodiment. Referring to FIG. 2, a calendar differential determining process is illustrated by a comparison of a monthly calendar of a merchant at two points in time. In this example, calendar 210 represents the merchant's availability at a first point in time and calendar 220 represents the merchant's availability at a second point in time. Both of the calendars 210 and 220 represent the same content (August 2016). However, in this example, the calendar 220 has a plurality of days marked as unavailable which are available in the calendar 210. According to various embodiments, web content of the calendar at both the first point in time 210 and the second point in time 220 may be extracted or otherwise collected from a merchant website by one or more booking verification servers 120 shown in FIG. 1 and compared with each other to identify differences. In this case, the difference between the calendar content is represented by period of time 222. Accordingly, the booking verification server may detect the period of time 222 as an apparent booking of the merchant associated with the calendar.

However, the merchant may be unavailable due to other reasons besides actual bookings. For example, the merchant may be closed, the merchant may doing repairs, or in the case of a rental property, the merchant may be occupying the rental property. According to various embodiments, whether the period of time 222 is a genuine booking or a non-booking (i.e., the merchant is unavailable for other reasons) may be detected based on additional information such as information about the apparent booking, information about the merchant, information about a geographical area in which the merchant is located, information about other merchants, and the like. FIG. 3 illustrates a further example of factors that may be used to determine whether an apparent booking is a genuine booking or not a genuine booking.

For example, the valid booking classifier (or a booking verification server) may use a number of attributes to predict genuine bookings of a rental property or other merchant. The attributes include one or more of the following.

1) length of stay
2) number of days from now a current point in time until the future stay (advanced purchase indicator)
3) Amount of total bookings in the area (geographical destination of the rental) within the same time period
4) price of staying at the rental property relative to the price of staying at other rental properties in the same area
5) Overall occupancy rate for a rental property
6) Entropy calculation of the booking calendar
7) Seasonality of the destination As an example, the entropy calculation may detect whether small gaps (1 or 2 days, etc.) exist in between apparent bookings or whether long periods of time are continuously blocked off. In the case of small gaps (entropy) it is much more likely to be genuine bookings in comparison to unavailability in which entire weeks or months of time are continuously listed as unavailable.

Using prediction of the amount of genuine bookings in a geographical destination for a particular point in time, various real-time benefits can be achieved such as determining supply and demand for supplies, identifying a regional value of the economic health, identifying travel trends, and the like. In contrast, in related art, information about how many people were staying in the area was only made available after the fact. In other words, it was not possible to predict how many genuine bookings are being made in a geographical area because an amount of bookings at a hotel is typically not made available. In addition, the example embodiments may be beneficial in other areas besides rental properties. For example, the embodiments could be applied to any industry involving bookings or reservations such as medical services, spas, restaurants, catering, photography, car services, performers, entertainment venues, boat rentals, trainers, and the like.

Figure 4:
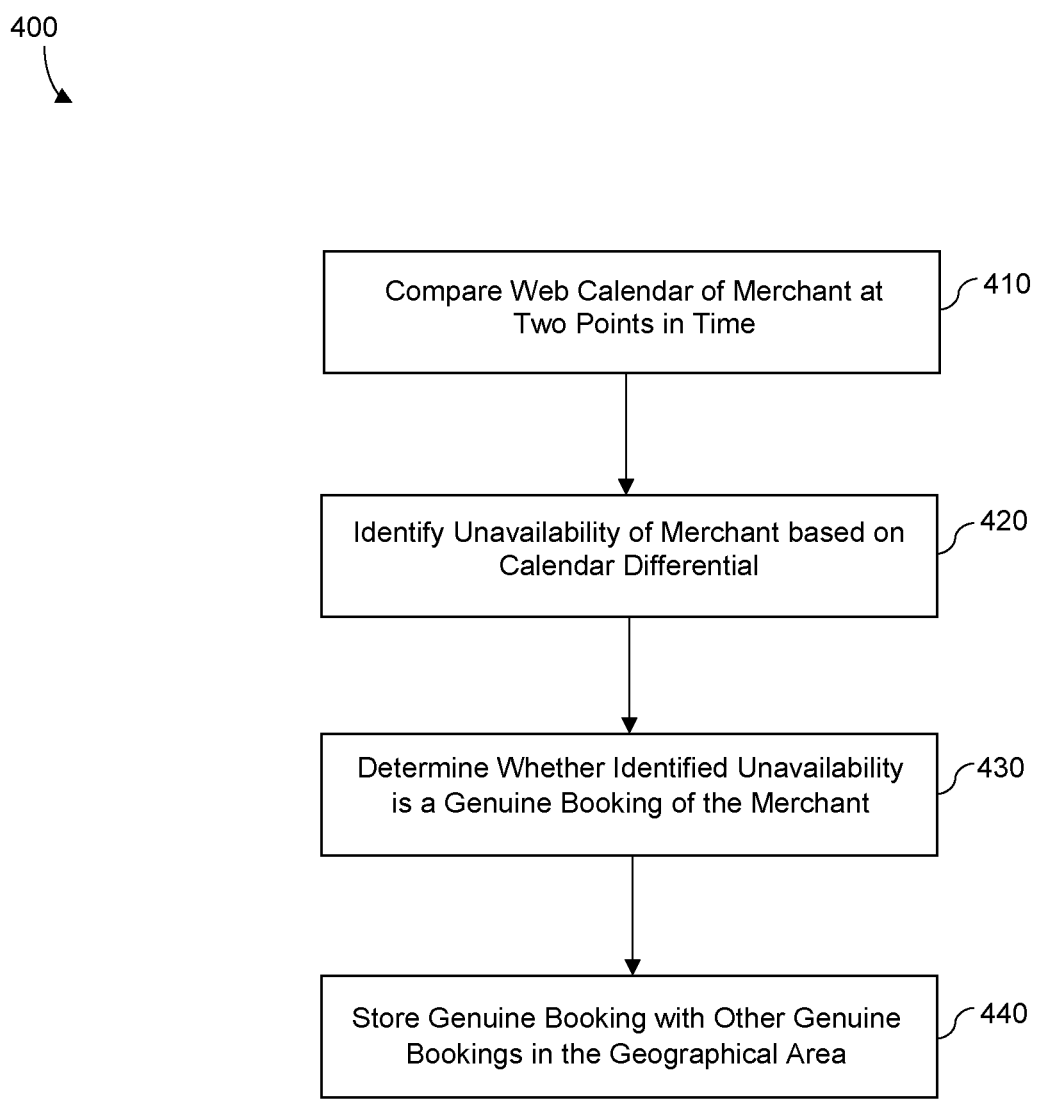
FIG. 4 is a diagram illustrating a method for determining genuine bookings in accordance with an example embodiment.

FIG. 4 illustrates a method 400 for determining genuine bookings in accordance with an example embodiment. As an example, the method 400 of FIG. 4 may be performed by one or more booking verification servers 120 shown in FIG. 1. Referring to FIG. 4, the method includes comparing web content from a merchant website at a first point of time and the web content from the merchant website at a second point of time, in 410. For example, the web content may be an online calendar or web calendar that includes calendar content such as an hourly calendar, a daily calendar, a weekly calendar, a monthly calendar, a yearly calendar, and the like. The web calendar may be listed on a website and may be associated with a merchant. For example, the calendar may be included in a web page associated with a rental property, vacation home, or other accommodation. The web calendar may distinguish between periods of time (e.g., hours, days, etc.) when the merchant is available for a new booking and periods of time when the merchant is unavailable. In the example of the rental property booking, the calendar content may be collected/extracted from a website of the rental property directly, it may be extracted/collected from a third party website such as a comparison site which includes content associated with the rental property, and the like.

In 420, the method further including identifying an apparent booking of the merchant associated with the website, at periodic intervals, based on a differential between the web content at the first point of time and the web content at the second point of time. An apparent booking may be identified based on a differential of calendar content between the first and second points of time. For example, a booking verification server may access the website at a first point in time and collect content from the calendar. At the first point in time, a block of time including a plurality of days may appear as available. The booking verification server may access the website at a second point in time that is subsequent to the first point in time, and collect content from the same calendar. Here, the block of time including the plurality of days may appear as unavailable. For example, the plurality of days may be positioned on a monthly calendar and be marked with a marking such as an X or a cross or shaded with a particular color to indicate that the plurality of days are not available. Accordingly, the booking verification server may detect the block of time as an apparent booking of the merchant associated with the calendar.

According to various embodiments, in 430 the method may determine whether the apparent booking identified in 420 is a genuine booking of the merchant or not a booking, based on information associated with the merchant. For example, information about the booking itself, information about the merchant, information about a geographic area where the merchant or the service is located, information about other merchants in the same geographic area, and the like, may be used to determine whether the apparent booking is a genuine booking. Accordingly, in response to determining that the apparent booking is a genuine booking of the merchant, in 440 the method includes storing an identification of the genuine booking of the merchant in a database along with identifications of other genuine bookings of other merchants. For example, the storing may include identifying a geographical location of the merchant and storing the identification of the genuine booking of the merchant along with identifications of other genuine bookings of other merchants having the same geographical location.

In some embodiments, the apparent booking may be an apparent booking of a rental property. In this example, whether the apparent booking is a genuine booking of the merchant may be determined based on one or more factors including length of stay information associated with the apparent booking, a number of days in the future until the apparent booking occurs (future booking indicator), information about other apparent bookings and/or genuine bookings of other rental properties in a same geographical location as the rental property, price information of the rental property, an entropy calculation of a calendar of the rental property including the apparent booking there within, seasonal information associated with the apparent booking of the rental property, and the like.

Figure 5:
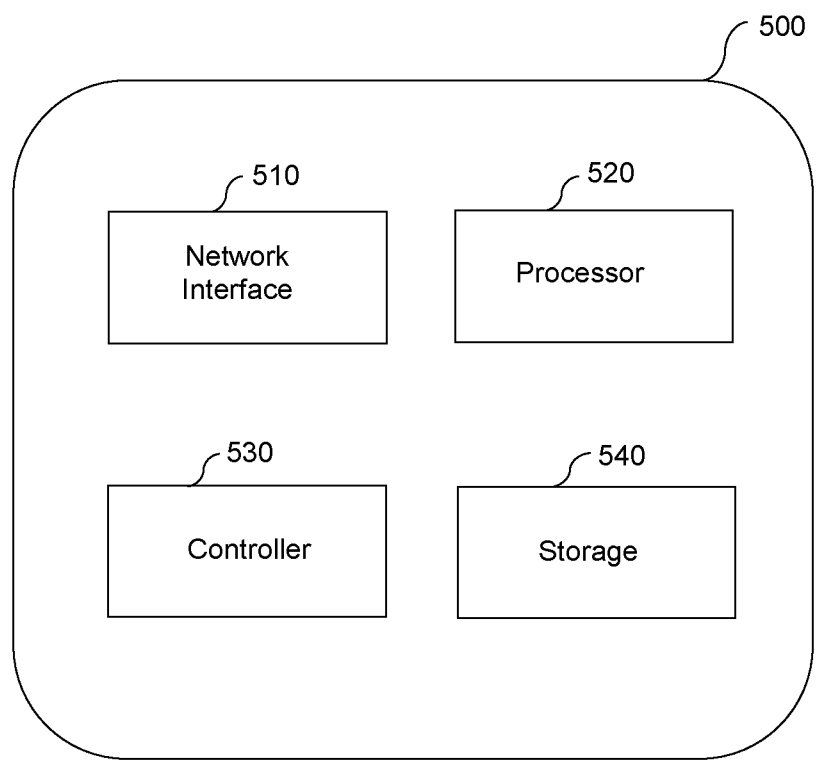
FIG. 5 is a diagram illustrating a computing device for determining genuine bookings in accordance with an example embodiment.

FIG. 5 illustrates a computing device 500 for determining genuine bookings in accordance with an example embodiment. For example, the computing device 500 may be one or more booking verification servers 120 shown in FIG. 1, and may be capable of performing the method 400 of FIG. 4, however the computing device 500 may be one or more other computing devices such as a cloud computing device, a web server, or the like. Referring to FIG. 5, the computing device 500 includes a network interface 510, a processor 520, a controller 530, and a storage 540. It should also be appreciated that the computing device 500 may include additional features not shown, for example, a display, a transmitter, a receiver, an input unit, and the like.

In this example, the network interface 510 is capable of receiving and transmitting data to other devices connected through a network such as the Internet. The processor 520 may control the overall operations of the computing device 500 and may include one or more processing devices that have a single core or multicores and may perform processing operations to perform the genuine booking determination described according to various example embodiments. The controller 530 may be a memory controller capable of accessing the storage 540 for storing information about calendar content, apparent bookings, genuine bookings, and the like, of merchants and other parties. As another example, the function of the controller 530 may be performed by the processor 520. The storage 540 may include one or more storage devices and/or databases. As another example, the storage 540 may be a cloud storage 540 that is external from the computing device 500 and accessible via the Internet.

According to various embodiments, the network interface 510 may receive web content from a host server of a merchant website at first and second points of time. In this example, the processor 520 may compare web content associated with a merchant at a first point of time and the web content associated with the merchant at a second point of time, and identify an apparent booking of the merchant based on a differential between the web content at the first point of time and the web content at the second point of time. For example, the web content may be an online calendar and the apparent booking may be identified based on a calendar differential between the first and second points in time. Furthermore, the processor 520 may determine whether the apparent booking is a genuine booking of the merchant or not a booking based on information associated with the merchant. Furthermore, the controller 530 may, in response to the processor 520 determining that the apparent booking is a genuine booking of the merchant, store an identification of the genuine booking of the merchant in the storage 540 along with identifications of other genuine bookings of other merchants.

In some embodiments, the apparent booking may be an apparent booking of a rental property (i.e. merchant). In this example, whether the apparent booking is a genuine booking of the merchant may be determined by the processor 520 based on one or more factors associated with the apparent booking, the rental property, the geographic area of the rental property, other rental properties, and the like. For example, the processor 520 may determine whether the apparent booking is a genuine booking based on length of stay information associated with the apparent booking, a number of days in the future until the apparent booking occurs, information about other apparent bookings and/or genuine bookings of other rental properties in a same geographical location as the rental property, price information of the rental property, an entropy calculation of a calendar of the rental property including the apparent booking there within, seasonal information associated with the apparent booking of the rental property, and the like.

The example embodiments are directed to a system and method for performing booking verification (such as by a booking verification server which may host a search engine or comparison website) and which may identify prices and availability of many rentable properties and other accommodations on the Internet. The booking verification system may view dates of availability of the rental properties. By looking at these dates, the booking verification system can identify, from day to day, when an apparent booking happens because a date corresponding to the booking is blocked off of a calendar. Furthermore, using additional metrics about the apparent booking, about the rental property, about other rental properties, and/or about a geographical area, the booking verification system can distinguish between what looks like a booking but is not, and what is an actual genuine booking.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
  extracting, by a processing device, digital content from an online calendar of a merchant website at a first point of time and digital content from the online calendar of the merchant website at a second point of time;
  detecting, by the processing device, and or more days within the online calendar that are available at the first point in time but which are unavailable at the second point in time based on a visual differential detected from the processing device comparing the digital content extracted at the first point of time and the digital content extracted at the second point of time;
  determining whether the one or more unavailable days are a genuine booking by a customer of the merchant or a non-booking caused by another unavailability of the merchant, based on attributes associated with one or more of the identified booking, the merchant, and other bookings of other merchants; and in response to determining that the identified booking is a genuine booking by the customer of the merchant, storing an identification of the genuine booking in a database along with identifications of other genuine bookings of other merchants.

2. The method of claim 1, wherein the storing comprises: identifying a geographical location of the merchant and storing the identification of the genuine booking with identifications of other genuine bookings of other merchants having the same geographical location.

3. The method of claim 1, wherein the online calendar comprises a booking calendar of a rental property.

4. The method of claim 3, wherein the determining is based on length of stay information associated with the rental property.

5. The method of claim 3, wherein the determining is based on information about a number of days until the one or more unavailable days occur.

6. The method of claim 3, wherein the determining is based on information about other bookings of other rental properties in a same geographical location as the rental property.

7. The method of claim 3, wherein the determining is based on price information of the rental property.

8. The method of claim 3, wherein the determining is based on entropy information of a calendar of the rental property including the one or more unavailable days of the rental property there within.

9. The method of claim 3, wherein the determining is based on seasonal information associated with the rental property.

10. The method of claim 1, wherein the determining comprises determining whether the one or more unavailable days are the genuine booking or the non-booking based on availability content on the online calendar with respect to days on the calendar other than the one or more unavailable days.

11. The method of claim 1, wherein the detecting the visual differential comprises the processing device detecting one or more of a different marking and a different shading within the one or more days on the online calendar between the first point in time and the second point of time.

12. A device comprising:
a processor configured to
extract digital content from an online calendar of a merchant website at a first point of time and digital content from the online calendar of the merchant website at a second point of time,
detect one or more days within the online calendar that are available at the first point in time but which are unavailable at the second point in time based on a visual differential detected from the processing device comparing the digital content extracted at the first point of time and the digital content extracted at the second point of time, and
determine whether the one or more unavailable days are a genuine booking by a customer of the merchant or a non-booking caused by another unavailability of the merchant based on attributes associated with one or more of the identified booking, the merchant, and other bookings of other merchants; and a controller configured to, in response to the processor determining that the identified booking is a genuine booking by a customer of the merchant, store an identification of the genuine booking in a database along with identifications of other genuine bookings of other merchants.

13. The device of claim 12, further comprising a network interface configured to receive the digital content from a host server of the merchant website at the first and second points of time.

14. A non-transitory computer-readable medium having instructions that when executed cause a computer to perform a method comprising:
extracting, by a processing device of the computer, digital content from an online calendar of a merchant website at a first point of time and digital content from the online calendar of the merchant website at a second point of time;
detecting, by the processing device, one or more days within the online calendar that are available at the first point in time but which are unavailable at the second point in time based on a visual differential detected from the processing device comparing the digital content extracted at the first point of time and the digital content extracted at the second point of time;
determining whether the identified booking is a genuine booking by a customer of the merchant or a non-booking caused by another unavailability of the merchant, based on attributes associated with one or more of the identified booking, the merchant, and other bookings of other merchants; and
in response to determining that the identified booking is a genuine booking by the customer of the merchant, storing an identification of the genuine booking in a database along with identifications of other genuine bookings of other merchants.

15. The non-transitory computer-readable medium of claim 14, wherein the storing comprises identifying a geographical location of the merchant and storing the identification of the genuine booking with identifications of other genuine bookings of other merchants having the same geographical location.

16. The non-transitory computer-readable medium of claim 14, wherein the online calendar comprises a booking calendar of a rental property.

17. The non-transitory computer-readable medium of claim 16, wherein the determining is based on length of stay information associated with the rental property.

18. The non-transitory computer-readable medium of claim 16, wherein the determining is based on information about a number of days until the one or more unavailable days occur.

19. The non-transitory computer-readable medium of claim 16, wherein the determining is based on price information of the rental property.

20. The non-transitory computer-readable medium of claim 16, wherein the determining is based on entropy information of a calendar of the rental property including the one or more unavailable days of the rental property there within.

* * * * *